United States Patent
Lu

(10) Patent No.: US 7,433,983 B2
(45) Date of Patent: Oct. 7, 2008

(54) METHOD FOR SUPPORTING RISER CARD BY BASIC INPUT/OUTPUT SYSTEM

(75) Inventor: Ying-Chih Lu, Taipei (TW)

(73) Assignee: Inventec Corporation, Taipei (TW)

( * ) Notice: Subject to any disclaimer, the term of this patent is extended or adjusted under 35 U.S.C. 154(b) by 92 days.

(21) Appl. No.: 11/519,024

(22) Filed: Sep. 12, 2006

(65) Prior Publication Data

US 2008/0065798 A1    Mar. 13, 2008

(51) Int. Cl.
G06F 13/00 (2006.01)
H05K 7/10 (2006.01)
(52) U.S. Cl. ........................... 710/104; 710/301
(58) Field of Classification Search ............... 710/104
See application file for complete search history.

(56) References Cited

U.S. PATENT DOCUMENTS

| | | | | |
|---|---|---|---|---|
| 5,446,869 A * | 8/1995 | Padgett et al. | ............... | 703/27 |
| 6,381,662 B1 * | 4/2002 | Harari et al. | ............... | 710/301 |
| 6,477,603 B1 * | 11/2002 | Locker et al. | ............... | 710/301 |
| 6,572,384 B1 * | 6/2003 | Marchevsky | ............... | 439/43 |
| 6,611,912 B1 * | 8/2003 | Maleck et al. | ............... | 713/100 |
| 6,671,748 B1 * | 12/2003 | Cole et al. | ............... | 710/8 |
| 6,889,280 B1 * | 5/2005 | Barmore | ............... | 710/301 |
| 6,893,268 B1 * | 5/2005 | Harari et al. | ............... | 439/43 |
| 7,162,554 B1 * | 1/2007 | Cole et al. | ............... | 710/104 |
| 7,266,627 B2 * | 9/2007 | DeNies et al. | ............... | 710/301 |
| 2006/0109636 A1 * | 5/2006 | Hood et al. | ............... | 361/792 |
| 2006/0218329 A1 * | 9/2006 | DeNies et al. | ............... | 710/301 |
| 2007/0094425 A1 * | 4/2007 | Chang | ............... | 710/69 |
| 2007/0101037 A1 * | 5/2007 | Lin et al. | ............... | 710/301 |
| 2007/0234025 A1 * | 10/2007 | Lu | ............... | 713/1 |
| 2008/0005270 A1 * | 1/2008 | Leigh et al. | ............... | 709/217 |

* cited by examiner

Primary Examiner—Paul R. Myers
Assistant Examiner—Ryan M Stiglic
(74) Attorney, Agent, or Firm—Bacon & Thomas, PLLC

(57) ABSTRACT

The present invention discloses a method for supporting a riser card by a basic input/output system (BIOS), which is implemented to the BIOS installed on a motherboard and having a plurality of configuration information corresponding to a plurality of resource information respectively and comprises the steps of performing a power-on self test; reading at least one resource information of the riser card installed on the motherboard and an interface card inserted into each slot of the riser card; obtaining the configuration information corresponding to the resource information in the BIOS based on the resource information of the riser card and the interface card; and providing the configuration information obtained to an operating system for enabling the riser card according to the configuration information.

7 Claims, 2 Drawing Sheets

METHOD FOR SUPPORTING RISER CARD BY BASIC INPUT/OUTPUT SYSTEM

FIELD OF THE INVENTION

The present invention relates to a method for supporting a riser card by a basic input/output system (BIOS), and more particularly to a method for supporting a riser card by BIOS.

BACKGROUND OF THE INVENTION

In recent years, servers are used extensively in corporations due to their sizes and specifications, and the servers can be installed in a machine room for their unified management. For instance, a blade server can be mounted onto a server rack for its operation, and one of the major features of the blade server resides on that different chipsets, electronic components and interface devices are installed in a very limited space of the blade server, such that the blade server has a higher performance than traditional servers. However, the housing of the blade servers is restricted to a height of 1 U (1 U=1¾" or 44.45 mm) by its specification, such that an interface card having a height exceeding the height of the housing cannot be inserted vertically and directly into a slot of a motherboard, even though the motherboard in the housing has many slots.

Based on the foregoing drawback, manufacturers developed a riser card, and the external look of the riser card is substantially the same as the interface card, and the difference between the riser card and the interface card resides on that the height of the riser card does not exceed the height of a circuit board of the housing, so that a lateral surface of the circuit board can have an expansion slot, and the direction of the opening of the expansion slot is 90 degrees from the slot. Therefore, the interface card can be inserted horizontally into the expansion slot, so that the interface card will be parallel to the motherboard and its height will not exceed the height of the housing.

However, other slots of the housing will be blocked after the interface card is inserted into the expansion slot. Although the foregoing arrangement can solve the problem on inserting the interface card vertically, it also reduces the expandability of the server. Therefore, manufacturers usually add a riser card to solve this problem and use a circuit comprised of different electronic components on the riser card to support the expansion slot with a communication protocol which is same or different as the slot, or a portion of the expansion slot of the riser card supports a communication protocol which is the same as the slot and another portion of the expansion slot supports a communication protocol which is different from the slot. To enable the riser card correctly, a basic input/output system (BIOS) of the server usually creates a configuration information in the basic input/output system to support the riser card, such that an operating system of the server can enable the riser card based on the configuration information.

However, an expansion slot of a riser card may have a device number equal to the device number of another expansion slot, while both expansion slots are using different interrupt request routers. For example, one kind of riser cards has a peripheral component interconnect extended (PCI-X) expansion slot, and another kind of riser cards has a peripheral component interconnect express (PCI-E) expansion slot and a PCI-X expansion slot as shown in the following table, and the two kinds of riser cards have different device numbers but they use the same interrupt request router as shown below:

| Expansion Slot | Device Number | Programmable Interrupt Controller Interrupt request router (PIC IRQ router) | Advanced Programmable Interrupt controller Interrupt request number (APIC IRQ number) |
|---|---|---|---|
| Riser Card 1: PCIX Slot | 3 | LINKA, C, B, D | 24, 26, 25, 27 |
| Riser Card 2: PCIX Slot | 3 | LINKC, A, D, B | 26, 24, 27, 25 |

Further, some riser cards have come with an IO APIC controller (such as PXH or PXHD), and some riser cards do not have the IO APIC controller. Further, the same PCI, PCI-X or PCI-E bridge has different configuration information due to the different riser card (such as a riser card having two PCI-E expansion slots or a riser card having one PXH and two PCI-E expansion slots).

In summation of the description above, the server has a basic input/output system (BIOS) for creating a configuration information to support only one particular riser card. If the configuration information of the riser card inserted to the server does not match with the configuration information of the riser card set in the basic input/output system, then the operating system of the server cannot enable the riser card properly. Thus, finding a way for the server to obtain the configuration information of the riser cards installed to the server from the basic input/output system, so as to enable different riser cards properly demands immediate attentions and feasible solutions.

SUMMARY OF THE INVENTION

In view of the foregoing shortcomings of the prior art, the inventor of the present invention based on years of experience to conduct extensive researches and experiments and finally invented a method for supporting a riser card by a basic input/output system in accordance with the present invention to overcome the foregoing shortcomings, in hope of contributing this novel idea and technology to the public.

Therefore, it is a primary objective of the present invention to provide a method for supporting a riser card by a basic input/output system, which is implemented to the basic input/output system installed on a motherboard and having a plurality of configuration information corresponding to a plurality of resource information respectively and enables the basic input/output system to perform a procedure comprising the steps of performing a power-on self test, reading at least one resource information of the riser card installed on the motherboard and an interface card inserted into each slot of the riser card, obtaining the configuration information corresponding to the resource information in the basic input/output system based on the resource information of the riser card and the interface card, and providing the configuration information obtained to an operating system. The operating system enables the riser card based on the configuration information, and thus the basic input/output system does not preset the configuration information of a single riser card, but it dynamically creates the configuration information according to the resource information that it reads, such that the operating system can enable different riser cards by reading the configuration information that matches each riser card from the basic input/output system, instead of simply supporting only one riser card. The present invention can overcome the shortcoming of the prior art that can support only one riser card by the basic input/output system.

To make it easier for our examiner to understand the objective, technical characteristics and effects of the present invention, a preferred embodiment will be described with accompanying drawings as follows:

DETAILED DESCRIPTION OF THE PREFERRED EMBODIMENTS

If an interface card is inserted into a slot of a riser card, and a basic input/output system of a motherboard is started, then the resource information such as a riser card ID and a slot number of each slot of the riser card will be read from the circuit installed on the riser card, and a device number and a bus number of the interface card connected to the basic input/output system will be read from a circuit installed on the interface card. The basic input/output system stores a plurality of sets of a programmable interrupt controller interrupt request routing table (PIC IRQ routing table), a multi-processor specification configuration table (MPS configuration table), and an advanced configuration power interface (ACPI) IRQ routing table (ACPI IRQ routing table) corresponding to various different combinations of interface cards and riser cards. The basic input/output system creates a configuration information based on each resource information of the interface card and the riser card. The configuration information includes each interrupt route (such as interrupt pin A, B, C, D) of the interface card, available interrupt numbers (such as a hexadecimal code 0xDC98 represents the available interrupt number of 3, 4, 7, 10, 11, 12, 14, 15) of each interrupt route, a register (such as registers 60h, 63h, 62h, 6Bh in a chipset of the motherboard) of each interrupt route, an IO advanced programmable interrupt controller (IO APIC controller) connected to each interrupt route (Interrupt Pin A, B, C, D), a pin number of an IO advanced programmable interrupt controller (IO APIC controller) connected to each interrupt route, and attributes (such as polarity, trigger and type) of each interrupt.

Figure 1:
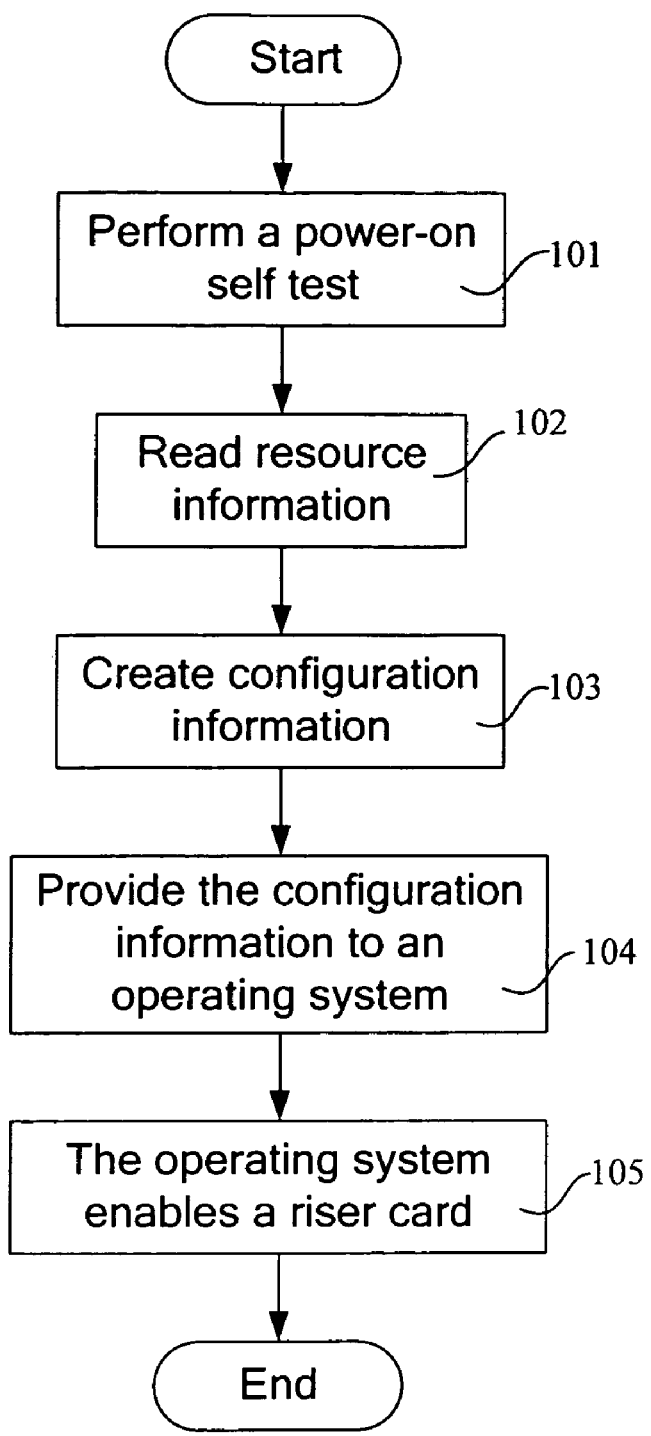
FIG. 1 is a flow chart of a method of the present invention.

Referring to FIG. 1 for a method for supporting a riser card by a basic input/output system in accordance with the present invention, a basic input/output system of a motherboard includes a configuration information corresponding to different resource information, such that after the basic input/output system performs a power-on self test (Step 101), the basic input/output system reads a plurality of resource information of a riser card installed on the motherboard and an interface card inserted into a slot of the riser card (Step 102), so that the basic input/output system creates a configuration information corresponding to the resource information based on the resource information (Step 103) and provides the configuration information to an operating system (Step 104), such that the operating system enables the riser card by the configuration information (Step 105), and thus after the basic input/output system of the motherboard starts performing the power-on self test for each time, a configuration information matched with the riser card will be created dynamically based on the resource information of the riser card which is currently installed on the motherboard and the configuration information will be provided to the operating system, instead of simply presetting the configuration information for a single riser card by the traditional basic input/output system and providing the configuration to an operating system only. Therefore, the method of the invention can overcome the shortcoming of the traditional basic input/output system that can support only one riser card.

Figure 2:
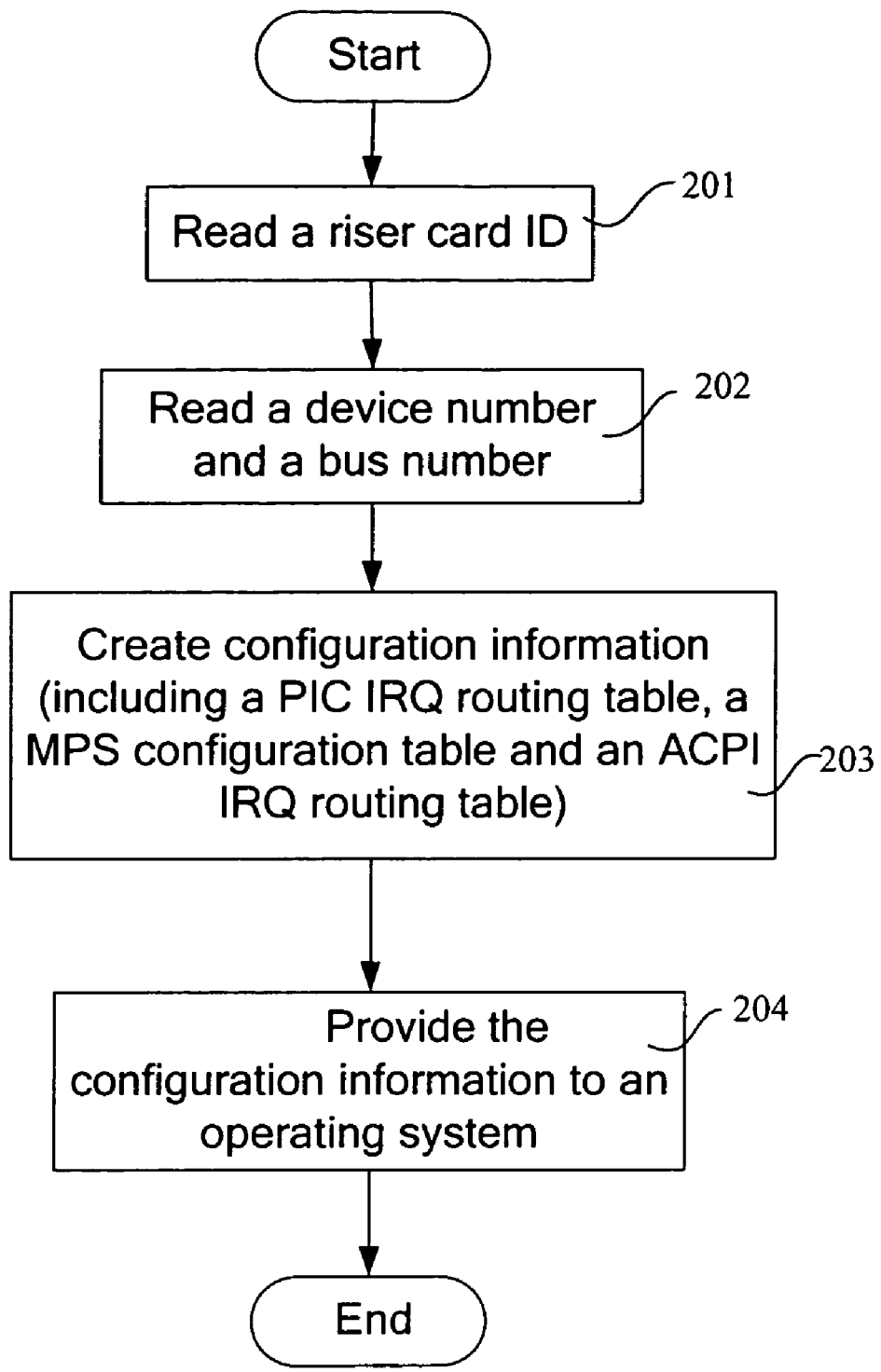
FIG. 2 is a flow chart of a method of reading resource information and creating configuration information by a BIOS in accordance with a method of the present invention.

Referring to FIG. 2 for a preferred embodiment of the present invention, the basic input/output system reads the resource information and creates the configuration information as follows:

(Step 201) Read a riser card ID;

(Step 202) Read a device number and a bus number of an interface card inserted to the riser card;

(Step 203) Obtain a programmable interrupt controller interrupt request routing table (PIC IRQ routing table), a multi-processor specification configuration table (MPS configuration table), and an advanced configuration power interface interrupt request routing table (ACPI IRQ routing table) corresponding to the resource information based on the resource information such as the riser card ID, device number and bus number to create a configuration information;

(Step 204) Provide the configuration information with the ACPI IRQ routing table, PIC IRQ routing table and MPS configuration table to the advanced configuration power interface (ACPI), programmable interrupt controller (PIC) and multi-processor specification (MPS) operating system.

In Step 204, the basic input/output system returns a multiple advanced programmable interrupt controller description table (MADT) and the portion labeled as "_PRT" in an ACPI machine language (AML) to the ACPI IRQ routing table for the use by the ACPI operating system.

In this embodiment, the programmable interrupt controller interrupt request routing table includes a bus number, a device number, a register of the interrupt route (Interrupt Pin A, B, C, D), an interrupt number of the interrupt route, and a slot number. The programmable interrupt controller interrupt request routing table (PIC IRQ routing table) is used by a PIC operating system. A preferred embodiment will be described below to illustrate the PIC IRQ routing table:

Assumed that the riser card ID is 3; the bus number is 6; the slot number of one of the slots of the riser card is 1; the device number of an interface card inserted into the slot is 3; the pin assignments of interrupt signals issued by the interface card are interrupt pins A, B, C, D; and the registers of the interrupt routes are 60h, 63h, 62h, 6Bh and the available interrupt number Interrupt Pins A, B, C, D) in hexadecimal is 0xDC98 when the operating system is at the programmable interrupt controller mode (binary digits 1101 1100 1001 1000 represent the available interrupt numbers 3, 4, 7, 10, 11, 12, 14, 15), the programmable interrupt controller interrupt request routing table (PIC IRQ routing table) of the operating system under the programmable interrupt controller mode is shown below:

| | | Pin A | | Pin B | | Pin C | | Pin D | | | |
|---|---|---|---|---|---|---|---|---|---|---|---|
| Bus | Dev | Reg | Map | Reg | Map | Reg | Map | Reg | Map | Slot | Rev |
| 0x06 | 0x18 | 0x60 | 0xDC98 | 0x63 | 0xDC98 | 0x62 | 0xDC98 | 0x6B | 0xDC98 | 0x01 | 0x00 |

The MPS configuration table (MPS Configuration Table) comprises an advanced programmable interrupt controller routing table (IO APIC controller entries) and a programmable interrupt controller interrupt request routing table (IRQ routing entries), wherein the IO controller routing table includes an IO APIC ID, an enable/disable information, a version information, and an MMIO address, etc. The programmable interrupt controller interrupt request routing table includes the bus number, device number, pin that issues an interrupt signal, IO APIC number, polarity, trigger (level or edge trigger), interrupt type, and wire number on IO APIC controller of on the IO APIC Controller. In the foregoing example, the IO controller routing table (IO APIC controller entries) and the programmable interrupt controller interrupt request routing table (IRQ routing entries) of the advanced programmable interrupt controller are listed below:

IO controller routing table (IO APIC controller entries)

| I/O APIC | ID: 2 | Enabled | Version: 20h | Address: fec00000h | Remark: IOAPIC controller#1 |
|---|---|---|---|---|---|
| I/O APIC | ID: 3 | Enabled | Version: 20h | Address: fec80000h | Remark: IOAPIC controller#2 |
| I/O APIC | ID: 4 | Enabled | Version: 20h | Address: fec84000h | Remark: IOAPIC controller#3, if an active riser card is present. |
| I/O APIC | ID: 5 | Enabled | Version: 20h | Address: fec84400h | Remark: IOAPIC controller#4, if an active riser card is present. |

The programmable interrupt controller interrupt request routing table (IRQ routing entries) of the IO APIC Number 3

| Bus | IRQ Signal | Dev | APIC | Wire | Polarity | Trigger | Type | IO/Local |
|---|---|---|---|---|---|---|---|---|
| 6:PCI | 0Ch: INT_A# | 3h | 3 | 0 | Low | Level | INT | I/O |
| 6:PCI | 0Dh: INT_B# | 3h | 3 | 3 | Low | Level | INT | I/O |
| 6:PCI | 0Eh: INT_C# | 3h | 3 | 2 | Low | Level | INT | I/O |
| 6:PCI | 0Fh: INT_D# | 3h | 3 | 1 | Low | Level | INT | I/O |

Since the IO controller routing table and the programmable interrupt controller interrupt request routing table of the advanced programmable interrupt controller and the foregoing tables are prior arts that come with standard formats, and thus they will not be described here.

In summation of the description above, the basic input/output system bases on an interrupt mode (PIC/APIC/MPS mode) currently set by the operating system and uses the multiple advanced programmable interrupt controller description table (ACPI MADT) and the code labeled as in the portion "_PRT" in the ACPI machine language (AML) correctly returns an interrupt request route to an ACPI operating system, and the MPS configuration table returns a "Signature _MP_" to a MPS operating system. Further, the programmable interrupt controller interrupt request routing table returns the "Signature $PIR" to a PIC operating system. Regardless of the mode, the operating system can enable a riser card correctly by providing the correct configuration information from the basic input/output system. From the foregoing tables, each table lists the resource information including a device number and a bus number, so that the present invention can find the corresponding configuration information by using a plurality of resource information.

Further, no matter which kind of riser card is installed to the motherboard, the basic input/output system can provide the configuration information matched with the riser card to the operating system. In other words, the basic input/output system starts performing the power-on self test, and then the riser card obtains the resource information or the resource information of each riser card and stores the information in the BIOS, and then the resource information of the corresponding riser card is found from the BIOS based on the riser card ID of the riser card, and the configuration information is created based on the resource information and provided to the operating system, so as to overcome the shortcoming of the traditional basic input/output system. Further the riser card ID of the riser card can be obtained from the riser card as illustrated in the examples of the I2C or GPI method.

While the invention herein disclosed has been described by means of specific embodiments, numerous modifications and variations could be made thereto by those skilled in the art without departing from the scope and spirit of the invention set forth in the claims.

What is claimed is:

1. A method for supporting a riser card by a basic input/output system, which is implemented to said basic input/output system installed on a motherboard and having a plurality of configuration information corresponding to a plurality of resource information respectively and enables said basic input/output system to perform a procedure comprising the steps of:

performing a power-on self test;

reading at least one resource information of said riser card installed on said motherboard and an interface card inserted into each slot of said riser card;

obtaining said configuration information corresponding to said resource information in said basic input/output system based on said resource information of said riser card and said interface card; and providing said configuration information obtained to an operating system;

wherein said operating system enables said riser card by said configuration information provided by said basic input/output system;

wherein each said resource information comprises at least an ID of said riser card and a device number and a bus number of said interface card; and wherein each said configuration information comprises a programmable interrupt controller interrupt request (PIC IRQ) routing table, a multi-processor specification (MPS) configuration table, and an advanced configuration power interface (ACPI) configuration table.

2. The method of claim 1, wherein said configuration information is provided to said operating system via an advanced programmable interrupt controller description table, an advanced configuration power interface machine language (AML) code, a programmable interrupt controller interrupt request (PIC IRQ) routing table or a multi-processor specification (MPS) configuration table installed in said basic input/output system.

3. The method of claim 2, wherein said operating system is an advanced configuration power interface (ACPI) operating system, a programmable interrupt controller (PIC) operating system or a multi-processor specification (MPS) operating system.

4. The method of claim 3, wherein said programmable interrupt controller interrupt request routing table comprises said bus number, said device number, a router register of an interrupt route, a usable interrupt number of an interrupt route and a slot number.

5. The method of claim 3, wherein said MPS configuration table comprises an IO controller routing table and a programmable interrupt controller interrupt request routing table of an advanced programmable interrupt controller.

6. The method of claim 3, wherein said advanced configuration power interface configuration table includes an advanced programmable interrupt controller IO controller routing table and a programmable interrupt controller interrupt request routing table.

7. The method of claim 6, wherein said basic input/output system bases on an advanced power configuration interface (APCI) interrupt mode currently set by said operating system and uses a multiple advanced programmable interrupt controller description table and an ACPI machine language code to correctly return each interrupt request route to said advanced configuration power interface (ACPI) operating system.

* * * * *